US012621698B2

(12) United States Patent
Marzban et al.

(10) Patent No.: US 12,621,698 B2
(45) Date of Patent: May 5, 2026

(54) INTERFERENCE REPORT BASED ON GAUSSIAN MIXTURE DISTRIBUTION

(71) Applicant: QUALCOMM Incorporated, San Diego, CA (US)

(72) Inventors: Mohamed Fouad Ahmed Marzban, San Diego, CA (US); Ahmed Elshafie, San Diego, CA (US); Wooseok Nam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 491 days.

(21) Appl. No.: 18/188,356

(22) Filed: Mar. 22, 2023

(65) Prior Publication Data

US 2024/0323728 A1      Sep. 26, 2024

(51) Int. Cl.
*H04W 24/10*          (2009.01)

(52) U.S. Cl.
CPC .................................... *H04W 24/10* (2013.01)

(58) Field of Classification Search
None
See application file for complete search history.

(56) References Cited

U.S. PATENT DOCUMENTS

| | | | |
|---|---|---|---|
| 2023/0006748 A1* | 1/2023 | Ryu | H04B 17/3913 |
| 2023/0217308 A1* | 7/2023 | Sandberg | G06N 3/0442 370/235 |

* cited by examiner

*Primary Examiner* — Idowu O Osifade
(74) *Attorney, Agent, or Firm* — Harrity & Harrity, LLP

(57)          ABSTRACT

Various aspects of the present disclosure generally relate to wireless communication. In some aspects, a user equipment (UE) may receive a configuration associated with an interference report. The UE may transmit the interference report in accordance with the configuration, wherein the interference report includes an indication of one or more parameters of a Gaussian mixture distribution that is fitted to an interference information distribution. Numerous other aspects are described.

30 Claims, 12 Drawing Sheets

500 ➔

510 ➔

520 ➔

600

610

| Mixing Probability | Number of bits for the Gaussian component parameters |
|---|---|
| $\pi \geq 0.5$ | 16 |
| $0.5 > \pi \geq 0.3$ | 8 |
| $\pi < 0.3$ | 4 |

620

| Mixing Probability $(\pi_1 \geq \pi_2 \geq \pi_3)$ | Number of bits for the Gaussian component parameters |
|---|---|
| $\pi_1$ | 16 |
| $\pi_2$ | 8 |
| $\pi_k \ \forall \ k > 2$ | 4 |

Periodic or semi-persistent resources for interference reports

800

Interference reports 810

CSI reports 820

Receive a configuration associated with an interference report

Transmit the interference report in accordance with the configuration, wherein the interference report includes an indication of one or more parameters of a Gaussian mixture distribution that is fitted to an interference information distribution

910

920

900

1010 Output a configuration associated with an interference report

1020 Obtain the interference report in accordance with the configuration, wherein the interference report includes an indication of one or more parameters of a Gaussian mixture distribution that is fitted to an interference information distribution

1000

1200

1208

Reception Component 1202

Communication Manager 1206

Transmission Component 1204

INTERFERENCE REPORT BASED ON GAUSSIAN MIXTURE DISTRIBUTION

FIELD OF THE DISCLOSURE

Aspects of the present disclosure generally relate to wireless communication and to techniques and apparatuses for an inference report that is based at least in part on a Gaussian mixture distribution.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The UE may include a memory and one or more processors coupled to the memory. The one or more processors may be configured to receive a configuration associated with an interference report. The one or more processors may be configured to transmit the interference report in accordance with the configuration, wherein the interference report includes an indication of one or more parameters of a Gaussian mixture distribution that is fitted to an interference information distribution.

Some aspects described herein relate to a network node for wireless communication. The network node may include a memory and one or more processors coupled to the memory. The one or more processors may be configured to output a configuration associated with an interference report. The one or more processors may be configured to obtain the interference report in accordance with the configuration, wherein the interference report includes an indication of one or more parameters of a Gaussian mixture distribution that is fitted to an interference information distribution.

Some aspects described herein relate to a method of wireless communication performed by a UE. The method may include receiving a configuration associated with an interference report. The method may include transmitting the interference report in accordance with the configuration, wherein the interference report includes an indication of one or more parameters of a Gaussian mixture distribution that is fitted to an interference information distribution.

Some aspects described herein relate to a method of wireless communication performed by a network node. The method may include outputting a configuration associated with an interference report. The method may include obtaining the interference report in accordance with the configuration, wherein the interference report includes an indication of one or more parameters of a Gaussian mixture distribution that is fitted to an interference information distribution.

Some aspects described herein relate to a non-transitory computer-readable medium that stores a set of instructions by a UE. The set of instructions, when executed by one or more processors of the UE, may cause the UE to receive a configuration associated with an interference report. The set of instructions, when executed by one or more processors of the UE, may cause the UE to transmit the interference report in accordance with the configuration, wherein the interference report includes an indication of one or more parameters of a Gaussian mixture distribution that is fitted to an interference information distribution.

Some aspects described herein relate to a non-transitory computer-readable medium that stores a set of instructions by a network node. The set of instructions, when executed by one or more processors of the network node, may cause the network node to output a configuration associated with an interference report. The set of instructions, when executed by one or more processors of the network node, may cause the network node to obtain the interference report in accordance with the configuration, wherein the interference report includes an indication of one or more parameters of a Gaussian mixture distribution that is fitted to an interference information distribution.

Some aspects described herein relate to an apparatus. The apparatus may include means for receiving a configuration associated with an interference report. The apparatus may include means for transmitting the interference report in accordance with the configuration, wherein the interference report includes an indication of one or more parameters of a Gaussian mixture distribution that is fitted to an interference information distribution.

Some aspects described herein relate to an apparatus. The apparatus may include means for outputting a configuration associated with an interference report. The apparatus may include means for obtaining the interference report in accordance with the configuration, wherein the interference report includes an indication of one or more parameters of a Gaussian mixture distribution that is fitted to an interference information distribution.

Aspects generally include a method, apparatus, system, computer program product, non-transitory computer-readable medium, UE, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 6 is a diagram illustrating an example associated with reporting one or more parameters of a Gaussian mixture distribution based on a quantization table, in accordance with the present disclosure.

DETAILED DESCRIPTION

Figure 1:
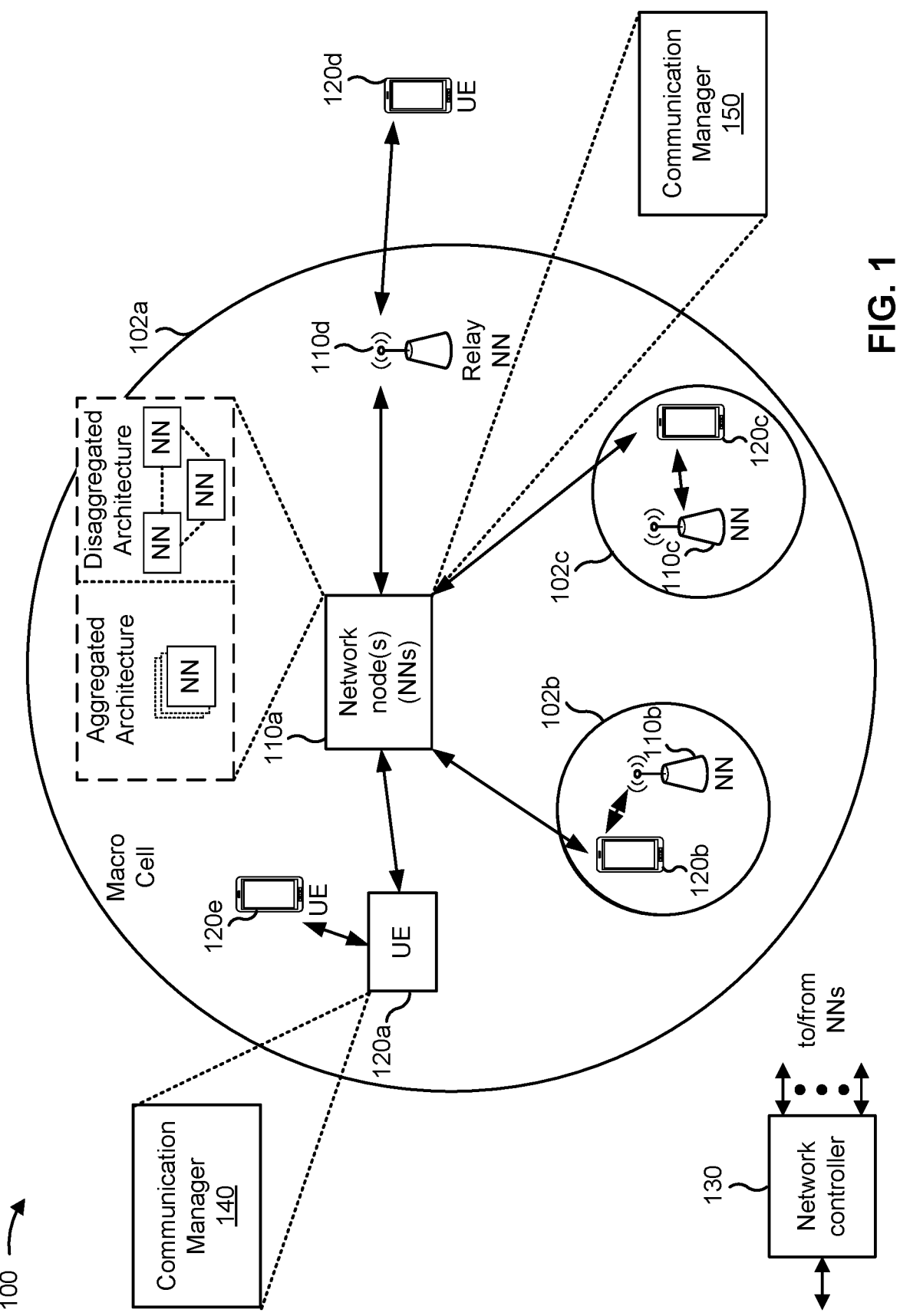
FIG. 1 is a diagram illustrating an example of a wireless network, in accordance with the present disclosure.

Interference may vary for a single user equipment (UE) over time and/or may vary among different UEs. Accordingly, each UE of a group of UEs may report respective interference information (e.g., interference information that is unique to the UE) to a base station (BS). However, a large amount of interference information transmitted to the BS by multiple UEs in the group may involve a large amount of overhead (e.g., resources), which may result in delayed or dropped transmissions.

Implementations are provided herein for transmission of an interference report based on a Gaussian mixture distribution that is fitted to an interference information distribution. In some examples, a BS may output, and a UE may receive, a configuration associated with an interference report. In accordance with the configuration, the UE may transmit, and the BS may obtain, an interference report including an indication of one or more parameters of a Gaussian mixture distribution that is fitted to an interference information distribution associated with the UE.

Including, in the interference report, an indication of one or more parameters of the Gaussian mixture distribution may reduce overhead compared to, for example, transmitting the interference information distribution to which the Gaussian mixture distribution is fitted. For example, the quantity of parameters included in the interference report that includes the parameter(s) of the Gaussian mixture distribution may be less than a quantity of parameters included in an interference report that includes the explicit interference information distribution.

In some aspects, the interference report may be based on a differential encoding scheme and/or a quantization table, which may further reduce the overhead associated with interference reporting. The differential encoding scheme may enable the UE to report Gaussian mixture distribution parameters relative to other Gaussian mixture distribution parameters, which may involve less overhead than (for instance) explicitly reporting each Gaussian mixture distribution parameter. The quantization table may identify the quantity of bits that is allocated for the Gaussian mixture distribution parameter(s), which may further reduce the overhead involved in transmitting the interference report.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a UE 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated BS), meaning that the network node 110 is configured to utilize a protocol stack that is physically or logically distributed among two or more nodes (such as one or more central units (CUs), one or more distributed units (DUs), or one or more radio units (RUS)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR BS, an LTE BS, a Node B, an CNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated BS, a disaggregated BS, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual BSs or one or more virtual BS functions. For example, in some aspects, two or more BS functions may be instantiated on a single device. In some aspects, the terms "base station" or "network node" may refer to one of the BS functions and not another. In this way, a single device may include more than one BS.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay BS, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as narrowband IoT (NB-IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120c) may communicate directly using one or more sidelink (SL) channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHZ) and FR2 (24.25 GHZ-52.6 GHZ). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHZ. For example, three higher operating bands have been identified as frequency range designations FR4a or FR4-1 (52.6 GHZ-71 GHz), FR4 (52.6 GHZ-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may transmit an inference report that is based at least in part on a Gaussian mixture distribution. Additionally, or alternatively, the communication manager 140 may perform one or more other operations described herein.

In some aspects, the network node 110 may include a communication manager 150. As described in more detail elsewhere herein, the communication manager 150 may obtain an inference report that is based at least in part on a Gaussian mixture distribution. Additionally, or alternatively, the communication manager 150 may perform one or more other operations described herein.

As indicated above, FIG. 1 is provided as an example. Other examples may differ from what is described with regard to FIG. 1.

Figure 2:
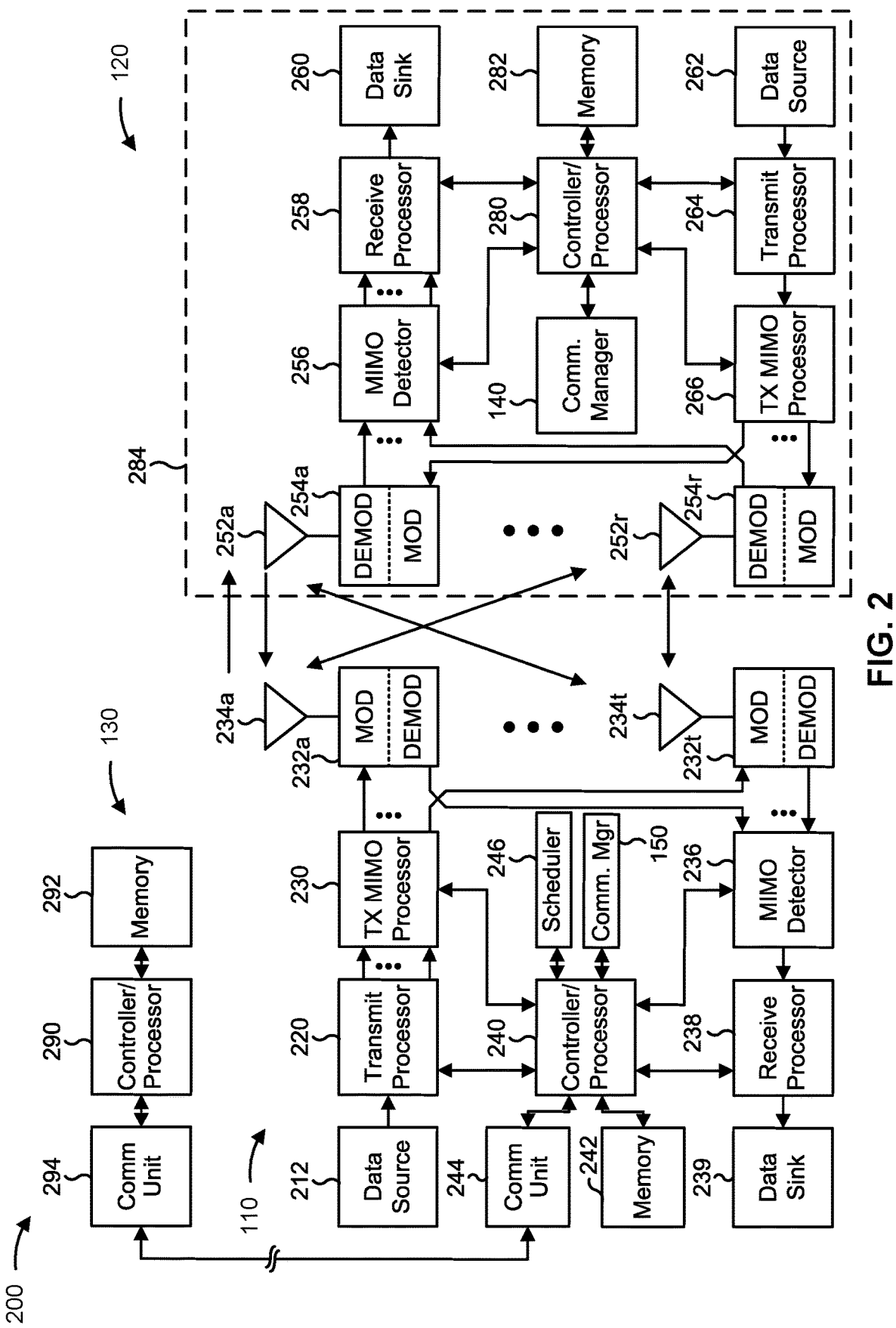
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and May provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-12).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-12).

The controller/processor 240 of the network node 110, the controller/processor 280 of the UE 120, and/or any other component(s) of FIG. 2 may perform one or more techniques associated with an inference report that is based at least in part on a Gaussian mixture distribution, as described in more detail elsewhere herein. For example, the controller/processor 240 of the network node 110, the controller/processor 280 of the UE 120, and/or any other component(s) of FIG. 2 may perform or direct operations of, for example, process 400 of FIG. 4, process 900 of FIG. 9, process 1000 of FIG. 10, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 400 of FIG. 4, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, the UE 120 includes means for receiving a configuration associated with an interference report; and/or means for transmitting the interference report in accordance with the configuration, wherein the interference report includes an indication of one or more parameters of a Gaussian mixture distribution that is fitted to an interference information distribution. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for outputting a configuration associated with an interference report; and/or means for obtaining the interference report in accordance with the configuration, wherein the interference report includes an indication of one or more parameters of a Gaussian mixture distribution that is fitted to an interference information distribution. The means for the network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a BS, or a network equipment may be implemented in an aggregated or disaggregated architecture. For example, a BS (such as a Node B (NB), an evolved NB (CNB), an NR BS, a 5G NB, an access point (AP), a TRP, or a cell, among other examples), or one or more units (or one or more components) performing BS functionality, may be implemented as an aggregated BS (also known as a standalone BS or a monolithic BS) or a disaggregated BS. "Network entity" or "network node" may refer to a disaggregated BS, or to one or more units of a disaggregated BS (such as one or more CUs, one or more DUs, one or more RUs, or a combination thereof).

An aggregated BS (e.g., an aggregated network node) may be configured to utilize a radio protocol stack that is physically or logically integrated within a single RAN node (e.g., within a single device or unit). A disaggregated BS (e.g., a disaggregated network node) may be configured to utilize a protocol stack that is physically or logically distributed among two or more units (such as one or more CUS, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

BS-type operation or network design may consider aggregation characteristics of BS functionality. For example, disaggregated BSs may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating BS functionality into one or more units that can be individually deployed. A disaggregated BS may include functionality implemented across two or more units at various physical locations, as well as functionality implemented for at least one unit virtually, which can enable flexibility in network design. The various units of the disaggregated BS can be configured for wired or wireless communication with at least one other unit of the disaggregated BS.

Figure 3:
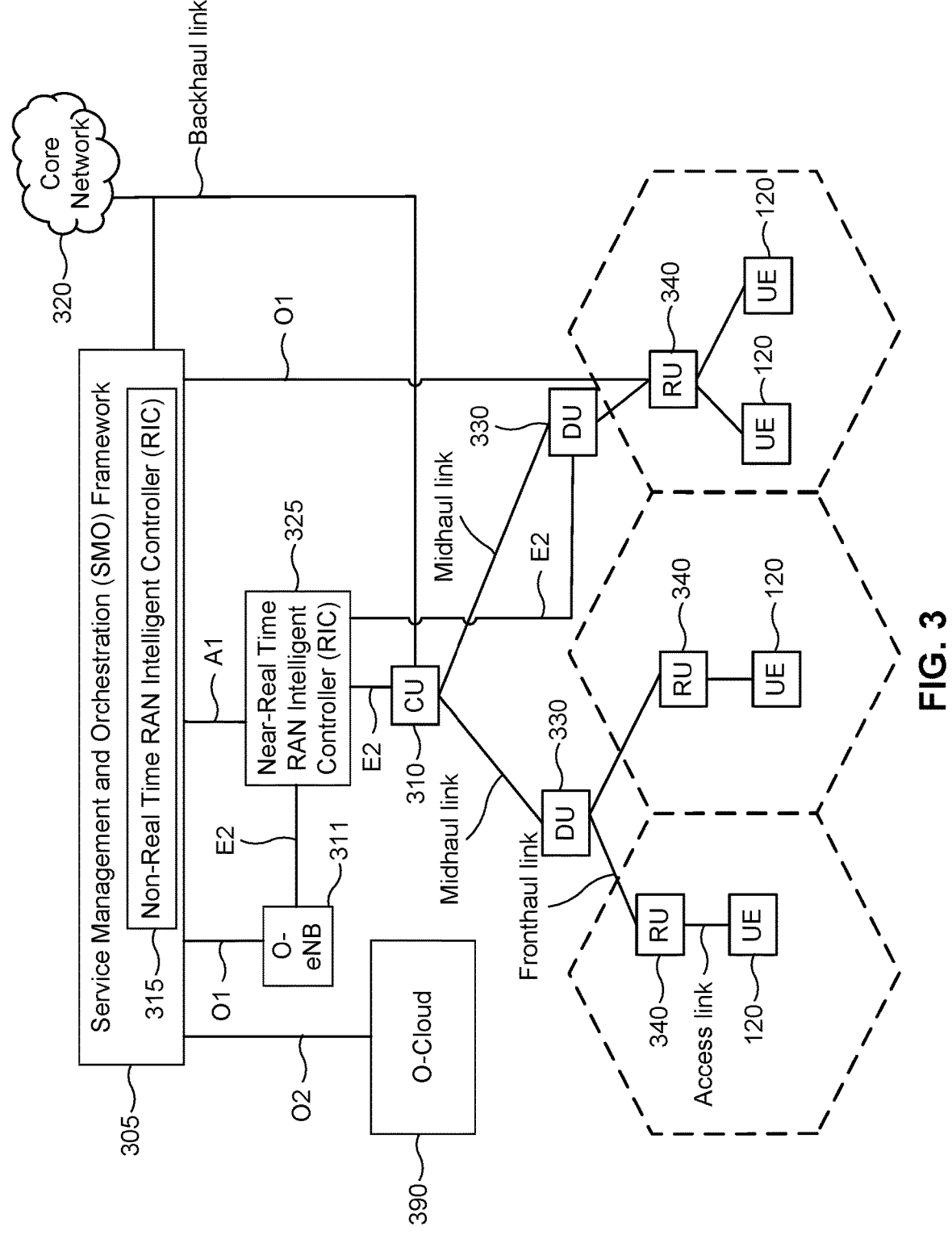
FIG. 3 is a diagram illustrating an example disaggregated base station architecture, in accordance with the present disclosure.

FIG. 3 is a diagram illustrating an example disaggregated BS architecture 300, in accordance with the present disclosure. The disaggregated BS architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more BS functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-CNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Interference information distributions may be multi-dimensional functions that vary in time, frequency and/or space across different UEs in a wireless communication system. Interference experienced by respective UEs in NR systems, for example, may vary because slot structures in NR are flexible. For instance, NR allows for mini-slots in ultra-reliable low latency communications (URLLC) use cases and unscheduled uplink transmissions without a grant. Furthermore, in NR, short transmission bursts within an enhanced mobile broadband (eMBB) slot may start at arbitrary symbol locations. NR also permits highly adaptive reference signal patterns and beam-based transmissions. In some examples, the highly adaptive reference signal patterns (e.g., DMRS and channel state information reference signal (CSI-RS) patterns) may depend on the quantity of antenna ports, delay tolerance, Doppler spread, or the like. In some examples, the beam-based transmissions may cause interference to fluctuate during beam changes (e.g., beam refinements). Thus, due to the flexibility of the slot structures, interference base distributions in NR may vary significantly among UEs.

Each UE may report respective interference information to a BS during wireless communication. In some examples, a UE may report interference information implicitly (e.g., in a channel state feedback (CSF) report). For example, the UE may measure interference and report metrics that combine interference level with other characteristics, such as channel estimation. The UE may measure the interference based on one or more interference measurement resources (e.g., CSI-RS, channel state information interference measurements (CSI-IMs), interference measurement resource (IMR) (which may be an example of the one or more interference measurement resources), or the like). Examples of metrics reported by the UE may include rank indicator (RI), channel quality indicator (CQI), precoding matrix indicator (PMI), or the like. Because implicit interference reporting combines interference level with other characteristics, the BS may be unable to reliably determine an interference information distribution based on a corresponding implicit interference report.

In some examples, the UE may report (and the BS may configure the UE to report) interference information explicitly. For example, the UE may report a signal-to-interference-plus-noise ratio (SINR). For example, the UE may transmit, to the BS, a synchronization signal SINR (SS-SINR), channel state information SINR (CSI-SINR), or the like. Based on the SS-SINR, the BS may perform mobility procedures, such as handovers. Based on the CSI-SINR, the BS may perform beam management, radio resource management, radio link failure detection, beam link failure detection, or the like.

Each UE explicitly reporting the interference distribution may create high overhead (e.g., an amount of overhead that is above a target threshold amount of overhead), which may result in delayed or dropped transmissions. Moreover, in some examples, a UE may report interference distributions for both estimated (e.g., measured) interference information and predicted (e.g., modeled) interference information, which may further increase overhead.

Figure 4:
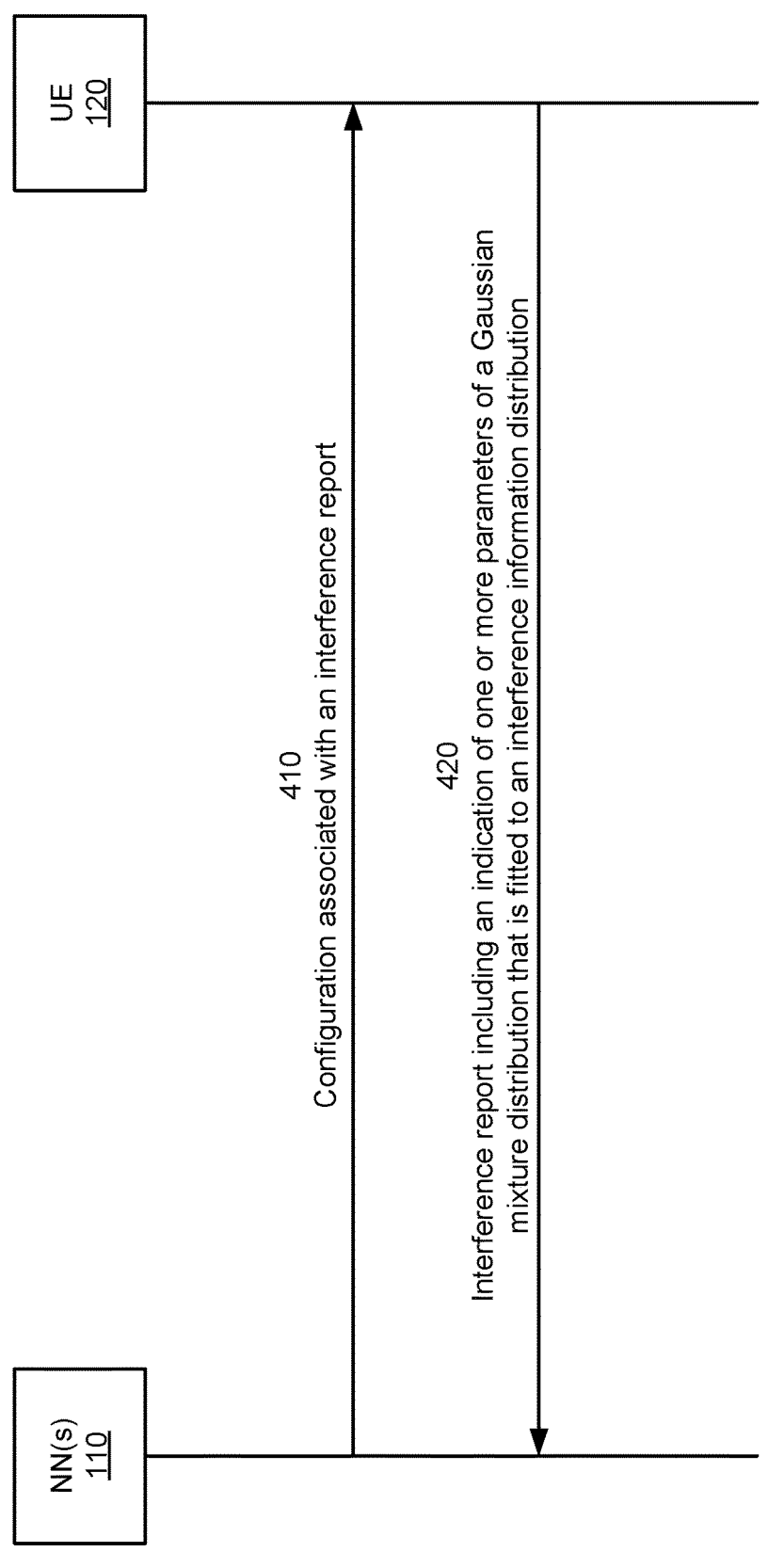
FIG. 4 is a diagram illustrating an example associated with overhead reduction for interference reporting, in accordance with the present disclosure.

FIG. 4 is a diagram illustrating an example 400 associated with overhead reduction for interference reporting, in accordance with the present disclosure. As shown in FIG. 4, a network node 110 and a UE 120 may communicate with one another.

As shown by reference number 410, the network node 110 may output, and the UE 120 may receive, a configuration associated with an interference report. The network node 110 may output the configuration as one or more messages or transmissions. The configuration may include any suitable example configuration described herein. The configuration may enable the network node 110 to control aspects of the interference report (e.g., content of the interference report, how the interference report is transmitted, when the interference report is transmitted, or the like).

As shown by reference number 420, the UE 120 may transmit, and the network node 110 may obtain, an interference report in accordance with the configuration. The interference report may include an indication of one or more parameters of a Gaussian mixture distribution that is fitted to an interference information distribution.

The Gaussian mixture distribution may be a parameterized model or function. The Gaussian mixture distribution may include multiple Gaussian components, identified by $k \in \{1, \ldots, K\}$, where K is the number of Gaussian components, and the interference information distribution is given by $p(X)=$ $$\sum_{k=1}^{K}$$

$\pi_k \mathbb{G}(X|\mu_k, \Sigma_k)$. Each Gaussian component may include one or more parameters, such as a respective mean $\mu_k$, a respective variance ok or a respective covariance matrix $\Sigma_k$, and a respective mixing probability $\pi_k$. The covariance matrix $\Sigma_k$ may define a correlation across space, time, or frequencies. The mixing probability $\pi_k$ may define a respective weight of each Gaussian component. The sum total of all mixing probabilities of the Gaussian mixture distribution may be one (e.g., $$\sum_{k=1}^{K} \pi_k = 1).$$

Thus, in some examples, the interference report may include an indication of one or more of a respective mean $\mu_k$, a respective variance $\sigma_k$ or a respective covariance matrix $\Sigma_k$, and/or a respective mixing probability $\pi_k$. In some examples, the Gaussian mixture distribution may be fitted to the interference information distribution using an expectation maximization algorithm.

Including, in the interference report, an indication of one or more parameters of the Gaussian mixture distribution (e.g., one or more of a respective mean $\mu_k$, a respective variance $\sigma_k$ or a respective covariance matrix $\Sigma_k$, and/or a respective mixing probability $\pi_k$) may reduce overhead compared to, for example, providing explicit interference reports as described above. For example, the quantity of parameters included in the interference report may be less than a quantity of parameters included in an explicit interference report. Thus, the Gaussian mixture distribution may enable efficient (e.g., low-overhead) reporting for an interference information distribution, which may improve resource availability and thereby reduce delayed or dropped transmissions.

The Gaussian mixture distribution may accurately fit the various base distributions of interference observed at multiple UEs. For example, the Gaussian mixture distribution may model various interference information distributions to account for different interference scenarios that a UE may experience. By way of comparison, a Gaussian distribution may not be a consistently accurate representation of interference experienced by UEs. For example, the mean and variance of a Gaussian distribution would summarize the interference information distribution less accurately than the one or more parameters of the Gaussian mixture distribution. Thus, reporting the interference information distribution as one or more parameters of a Gaussian mixture distribution may reduce the reporting overhead while ensuring that the reported interference accurately represents the interference information distribution.

The interference information distribution may include estimated interference information or predicted interference information. For example, the UE 120 may observe interference measurement resources (e.g., CSI-RS, CSI-IM, IMR, or the like) and, based on the interference measurement resources, derive the estimated interference information or generate the predicted interference information. In some examples, the UE 120 may derive the estimated interference information by estimating the interference distribution for past resources for the UE 120. In some examples, the UE 120 may generate the predicted interference information by predicting the interference distribution of future resources for the UE 120. The UE 120 may generate the predicted interference information using any suitable technique, such as an AI/ML model, a minimum mean square error (MMSE) estimator (e.g., an MMSE estimator capable of outputting negative predictions), a modified MMSE estimator (e.g., an MMSE estimator capable of outputting the most recent interference measurement instead of a negative prediction), averaging (e.g., averaging of interference measurements of a most recent quantity of slots), or the like.

Based on the estimated interference information and/or predicted interference information, the network node 110 may perform mobility procedures, beam management, radio resource management, radio link failure detection, beam link failure detection, scheduling decision-making, reference signal design (e.g., for demodulation), or the like. Including an indication of one or more parameters of a Gaussian mixture distribution in an interference information report may reduce overhead that would otherwise be introduced due to the estimated interference information and/or predicted interference information (e.g., due to both the estimated interference information and the predicted interference information).

As indicated above, FIG. 4 is provided as an example. Other examples may differ from what is described with respect to FIG. 4.

The interference information distribution may include interference power information, SINR information, or the like. Interference power may be the power of interference from one or more interfering signals. SINR may be a ratio of target signal power to the sum of the interference power and noise.

Figure 5:
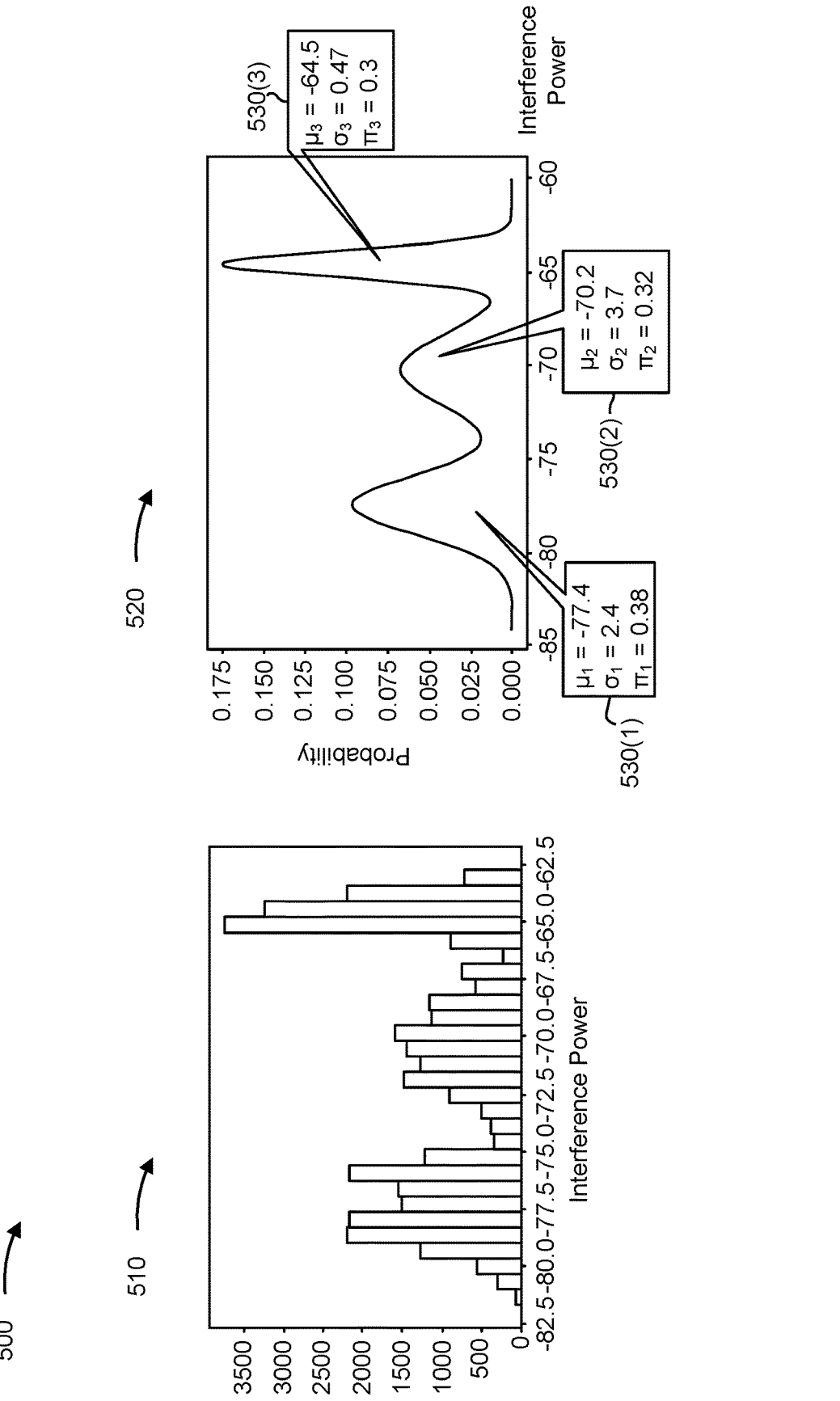
FIG. 5 is a diagram illustrating an example of an interference information distribution that includes interference power information represented as a Gaussian mixture distribution, in accordance with the present disclosure.

FIG. 5 is a diagram illustrating an example 500 of an interference information distribution 510 that includes interference power information represented as a Gaussian mixture distribution 520, in accordance with the present disclosure. The interference information distribution 510 may be a distribution of counts of estimated or predicted interference power over ranges of the estimated or predicted interference power. For example, the interference information distribution 510 may be observed by a UE using system-level simulations. The Gaussian mixture distribution 520 may be fitted to the interference information distribution 510 using three Gaussian components 530(1)-530(3). For example, each Gaussian component 530(1), 530(2), and 530(3) includes a respective mean $\mu$, a respective variance $\sigma$, and a respective mixing probability $\pi$.

In some examples, a UE may transmit, and a network node may receive, an interference report that includes an indication of one or more parameters of the Gaussian mixture distribution 520. For example, instead of including all of the parameters associated with the interference information distribution 510 (e.g., every count and corresponding range), the interference report may include an indication of the nine parameters of the Gaussian mixture distribution 520 (e.g., the respective means $\mu$, the respective variances $\sigma$, and the respective mixing probabilities $\pi$), which may reduce overhead involved in transmitting the interference report.

As indicated above, FIG. 5 is provided as an example. Other examples may differ from what is described with regard to FIG. 5.

In some aspects, a network node (e.g., network node 110) may output, and a UE (e.g., UE 120) may receive, a configuration that configures the UE to include, in an interference report, an indication of one or more parameters of a Gaussian mixture distribution that is fitted to an interference information distribution based on a differential encoding scheme. For example, the configuration may be the configuration shown by reference number 410 in FIG. 4, and the interference report may be the interference report shown by reference number 420 in FIG. 4. In accordance with the configuration, the UE may transmit, and the network node may obtain, an interference report that includes the indication of the one or more parameters based on the differential encoding scheme.

The differential encoding scheme may further reduce overhead involved in transmitting the interference report. For example, the interference report may report at least one of the parameters relative to at least another of the parameters using the differential encoding scheme, which may involve less overhead than (for instance) explicitly reporting each respective parameter (e.g., explicitly reporting each mean $\mu_k$, each variance $\sigma_k$ or covariance matrix $\Sigma_k$, and/or each mixing probability $\pi_k$).

In some examples, the configuration may configure the UE to include, in the interference report, the indication of the one or more parameters relative to one or more reference parameters of a reference Gaussian component. For example, the reference Gaussian component may be defined by the network node. For example, the reference Gaussian component may be included in the configuration. The reference parameters may include a reference mean $\mu_{ref}$, a reference variance $\sigma_{ref}$ or covariance matrix $\Sigma_{ref}$, and/or a reference mixing probability $\pi_{ref}$.

The interference report may include an indication of the one or more parameters relative to the one or more reference parameters (e.g., based on the differential encoding scheme). For example, the indication may indicate a difference between a reference parameter and a parameter of the Gaussian mixture distribution. For example, the indication may indicate a difference between $\mu_{ref}$ and $\mu_k$, a difference between $\sigma_{ref}$ and $\sigma_k$, a difference between $\Sigma_{ref}$ and $\Sigma_k$, and/or a difference between $\pi_{ref}$ and $\pi_k$.

In some examples, the configuration may configure the UE to include, in the interference report, an indication of one or more first parameters of a first Gaussian component of the Gaussian mixture distribution relative to one or more second parameters of a second Gaussian component of the Gaussian mixture distribution. The interference report may include an indication of the one or more first parameters relative to the one or more second parameters (e.g., based on the differential encoding scheme). In some examples, the first parameter(s) and second parameter(s) may include mixing probabilities (e.g., $\pi_1$ and $\pi_2$).

In some examples, the second parameter(s) (e.g., relative to which the first parameter(s) are reported) may include a mixing probability that is the highest mixing probability of the Gaussian mixture distribution. For example, the mixing probability may be the greatest among all mixing probabilities of each Gaussian component of the Gaussian mixture distribution. For example, a Gaussian mixture distribution may include three Gaussian components: a first Gaussian component with parameters $\pi_1$, $\mu_1$ and $\sigma_1$, a second Gaussian component with parameters $\pi_2$, $\mu_2$, and $\sigma_2$, and a third Gaussian component with parameters $\pi_3$, $\mu_3$, and $\sigma_3$. In this example, $\pi_1=0.40$, $\pi_2=0.35$, and $\pi_3=0.25$. Thus, because $\pi_1=0.40$ is the highest mixing probability, $\pi_2$, $\mu_2$, and $\sigma_2$ may be reported using respective deltas with $\pi_1$, $\mu_1$ and $\sigma_1$ (e.g., $\pi_1-\pi_2$, $\mu_1-\mu_2$, and $\sigma_1-\sigma_2$), and $\pi_3$, $\mu_3$, and $\theta_3$ may also be reported using respective deltas with $\pi_1$, $\mu_1$ and $\sigma_1$ (e.g., $\pi_1-\pi_3$, $\mu_1-\mu_3$, and $\sigma_1-\sigma_3$). $\pi_1$, $\mu_1$, and $\sigma_1$ may be reported explicitly.

In some examples, the second parameter(s) (e.g., which the first parameter(s) are reported relative to) may include a mixing probability that is the closest mixing probability of the Gaussian mixture distribution to the mixing probability of the first parameter(s). For example, the mixing probability of the second parameter(s) may be closer to the mixing probability of the first parameter(s) than any other mixing probability of the Gaussian components of the Gaussian mixture distribution. Consider the example in which $\pi_1=0.40$, $\pi_2=0.35$, and $\pi_3=0.25$. Because $\pi_1-\pi_2=0.05$ is less than $\pi_1-\pi_3=0.15$, $\pi_1$ is the closest mixing probability to $\pi_2$. Therefore, $\pi_2$, $\mu_2$, and $\sigma_2$ may be reported using respective deltas with $\pi_1$, $\mu_1$ and $\sigma_1$ (e.g., $\pi_1-\pi_2$, $\mu_1-\mu_2$, and $\sigma_1-\sigma_2$). Furthermore, because $\pi_1-\pi_3=0.15$ and $\pi_1-\pi_2=0.10$, $\pi_2$ is the closest mixing probability to $\pi_3$. Therefore, $\pi_3$, $\mu_3$, and $\sigma_3$ may be reported using respective deltas with $\pi_2$, $\mu_2$ and $\sigma_2$ (e.g., as deltas of deltas, such as $\pi_1-\pi_2-\pi_3$, $\mu_1-\mu_2-\mu_3$, and $\sigma_1-\sigma_2-\sigma_3$). $\pi_1$, $\mu_1$, and $\sigma_1$ may be reported explicitly (e.g., without reference to other parameters).

In some examples, the configuration may configure the UE to exclude, from the interference report, any parameters of the Gaussian mixture distribution that are associated with one or more mixing probabilities below a threshold. For example, the network node may configure the UE to avoid reporting the parameters of any Gaussian component having a mixing probability below the threshold. For example, if $\pi_1$ is below the threshold, then the UE may refrain from reporting $\pi_1$, $\mu_1$, and $\sigma_1$. Thus, the UE may transmit, and the network node may obtain, an interference report that excludes any parameters of the Gaussian mixture distribution that are associated with one or more mixing probabilities below the threshold.

Excluding any parameters of the Gaussian mixture distribution that are associated with one or more mixing probabilities below the threshold may reduce overhead compared to the overhead that would be involved in transmitting an interference report that includes those parameters. Furthermore, because the mixing probability defines the weight of the Gaussian component, the Gaussian component having a mixing probability below the threshold may contribute negligibly to the accuracy of the fit of the Gaussian mixture distribution to the interference information distribution. For example, the network node may carry out the same or similar operations (e.g., operations relating to mobility procedures, beam management, radio resource management, radio link failure detection, beam link failure detection, scheduling decision-making, reference signal design, or the like) based on the interference report regardless of whether the interference report includes the parameters of the Gaussian component having a low mixing probability. As a result, excluding the parameters of the Gaussian component when the mixing probability is below a threshold may have negligible impact on the accuracy of the fit of the Gaussian mixture distribution to the interference information distribution.

FIG. 6 is a diagram illustrating an example 600 associated with reporting one or more parameters of a Gaussian mixture distribution based on a quantization table, in accordance with the present disclosure. In some examples, a network node (e.g., network node 110) may output, and a UE (e.g., UE 120) may receive, a configuration that configures the UE to include, in an interference report, an indication of one or more parameters of a Gaussian mixture distribution that is fitted to an interference information distribution based on a quantization table. For example, the configuration may be the configuration shown by reference number 410 in FIG. 4, and the interference report may be the interference report shown by reference number 420 in FIG. 4. In accordance with the configuration, the UE may transmit, and the network node may obtain, an interference report that includes the indication of the one or more parameters based on the quantization table.

A quantization table may correlate (e.g., map) values of a mixing probability to respective quantities of quantization bits. The quantization bits may be allocated for one or more parameters of the Gaussian mixture distribution. For example, the interference report may carry the quantity of bits to indicate the one or more parameters. In some examples, the quantization tables may be defined in a standards specification, and the network node may indicate a table index to the UE (e.g., based on an environment of the UE and/or an environment of the network node).

In some examples, the network node may configure the UE to use a particular quantization table depending on a value of a mixing probability. For example, the network node may configure the UE to use a higher quantity of quantization bits for Gaussian components having higher mixing probabilities. Including an indication of the one or more parameters of the Gaussian mixture distribution based on the quantization table may enable the network node to control the quantity of bits that is allocated for the parameter(s), which may further reduce the overhead involved in transmitted the interference report. Furthermore, because Gaussian components having higher mixing probabilities may contribute more to the Gaussian mixture distribution than Gaussian components having lower mixing probabilities, the Gaussian components having higher mixing probabilities may be prioritized over the Gaussian components having lower mixing probabilities (e.g., the Gaussian components having higher mixing probabilities may be allocated more quantization bits than the Gaussian components having lower mixing probabilities).

FIG. 6 illustrates a first quantization table 610 and a second quantization table 620. The first quantization table 610 and/or the second quantization table 620 may be used to assign a quantity of quantization bits to one or more parameters of a Gaussian mixture distribution. For example, first quantization table 610 and/or the second quantization table 620 may allocate a higher quantity of quantization bits for Gaussian components having higher mixing probabilities, as described above.

The first quantization table 610 defines quantities of quantization bits based on respective value ranges for the one or more mixing probabilities. The first quantization table 610 allocates 16 bits for parameters of a Gaussian component having a mixing probability greater than or equal to 0.5; 8 bits for parameters of a Gaussian component having a mixing probability less than 0.5 and greater than or equal to 0.3; and 4 bits for parameters of a Gaussian component having a mixing probability less than 0.3. While specific quantities are provided in FIG. 6, in general a quantization table, such as the first quantization table 610, may map any suitable quantity of bits to any suitable value range(s) for a mixing probability. Furthermore, in general, a quantization table (e.g., the first quantization table 610) may contain any suitable quantity of entries.

The second quantization table 620 defines quantities of quantization bits based on a numerical order of values for the one or more mixing probabilities. While specific quantities are provided in FIG. 6, in general a quantization table, such as the second quantization table 620, may map any suitable quantity of bits to respective mixing probabilities in any suitable numerical order. Furthermore, in general, a quantization table (e.g., the second quantization table 620) may contain any suitable quantity of entries.

Including an indication of the one or more parameters of the Gaussian mixture distribution based on the first quantization table 610 and/or the second quantization table 620 may enable the network node to control the quantity of bits that is allocated for the parameter(s), which may result in overhead reduction associated with transmitting the interference report, as discussed above. Additionally, the second quantization table 620 may allow the network node to identify, unambiguously, which parameters in the interference report are associated with respective Gaussian components.

As indicated above, FIG. 6 is provided as an example. Other examples may differ from what is described with respect to FIG. 6.

Figure 7:
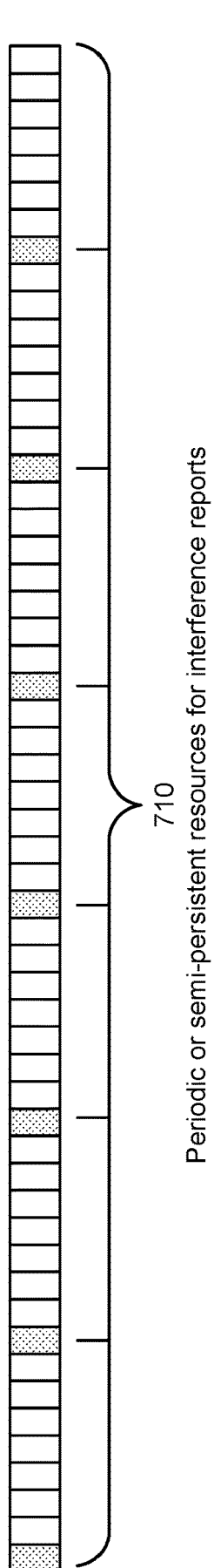
FIG. 7 is a diagram illustrating an example associated with using periodic or semi-persistent resources to transmit respective interference reports, in accordance with the present disclosure.

FIG. 7 is a diagram illustrating an example 700 associated with using periodic or semi-persistent resources to transmit respective interference reports, in accordance with the present disclosure. In example 700, periodic or semi-persistent resources 710 (e.g., uplink periodic or semi-persistent resources) may be configured for interference report transmissions.

In some examples, a network node (e.g., network node 110) may output, and a UE (e.g., UE 120) may receive, a configuration that configures periodic or semi-persistent resources for the UE to transmit respective interference reports. For example, the configuration may be the configuration shown by reference number 410 in FIG. 4, and the respective interference reports may include the interference report shown by reference number 420 in FIG. 4. In accordance with the configuration, the UE may transmit, and the network node may obtain, the interference report via a first periodic or semi-persistent resource of the periodic or semi-persistent resources 710 (e.g., via any of the periodic or semi-persistent resources 710). The periodic resources may include physical uplink control channel (PUCCH) resources, and/or the semi-persistent resources may include physical uplink shared channel (PUSCH) resources (e.g., a semi-persistent scheduling (SPS) resource, a configured grant (CG) resource, or the like).

In some examples, the network node may configure a periodicity of the periodic or semi-persistent resources 710 based on the environment of the UE and/or the network node, correlation properties of the interference, or the like. For example, if the interference has low temporal correlation properties (e.g., high interference variations over time), then the network node may configure low periodicity for the reported interference, which may allow the UE to update the mixture distribution parameters more frequently.

Configuring the periodic or semi-persistent resources 710 for the UE to transmit respective interference reports may enable the UE to regularly provide, to the network node, updated Gaussian mixture distribution parameters. The network node may use the regularly-transmitted interference reports, for instance, to account for estimated and/or predicated interference information during scheduling.

In some examples, the UE may transmit, and the network node may obtain, via a second periodic or semi-persistent resource, a second interference report. For example, the UE may transmit the second interference report via a second periodic or semi-persistent resource after transmitting the first interference report via the first periodic or semi-persistent resource (e.g., the second periodic or semi-persistent resource may occur after the first periodic or semi-persistent resource). The second interference report may include an indication of one or more second parameters of a second Gaussian mixture distribution. For example, the second Gaussian mixture distribution may represent the interference experienced by the UE (or predicted to be experienced by the UE) at a time after the UE experiences (or predicts to experience) the interference represented by the first Gaussian mixture distribution.

The second interference report may include the indication of the one or more second parameters relative to the one or more first parameters in the first interference report. For example, the network node may configure the UE to report the second parameter(s) using differential reporting relative to the parameters reported in the first periodic or semi-persistent resource (e.g., the most recent resource from the second resource). For example, the UE may report the difference between the second parameter(s) and the first parameter(s), which may reduce overhead compared to (for instance) explicitly reporting the second parameter(s).

As indicated above, FIG. 7 is provided as an example. Other examples may differ from what is described with respect to FIG. 7.

Figure 8:
FIG. 8 is a diagram illustrating an example associated with an interference report that is multiplexed with an uplink communication, in accordance with the present disclosure.
Figure 8:

FIG. 8 is a diagram illustrating an example 800 associated with an interference report that is multiplexed with an uplink communication, in accordance with the present disclosure. As shown, a plurality of interference reports 810 may be multiplexed with a plurality of uplink communications. In some examples, the uplink communications may include other reports, such as at least one of a channel state information (CSI) report, PUSCH resource, hybrid automatic repeat request acknowledgment (HARQ-ACK) resource, CSI, scheduling request (SR), buffer status report (BSR), power headroom report (PHR), or the like. In example 800, the uplink communications may include CSI reports 820.

In some examples, a network node (e.g., network node 110) may output, and a UE (e.g., UE 120) may receive, a configuration that configures the UE to multiplex (e.g., piggyback) an interference report with an uplink communication. For example, the configuration may be the configuration of reference number 410 in FIG. 4, and the interference report may include the interference report of reference number 420 in FIG. 4. In accordance with the configuration, the UE may multiplex the interference report with the uplink communication.

Multiplexing the interference report with another report (e.g., one of CSI reports 820) may help ensure that the interference report is reported in a timely manner. For example, multiplexing the interference report may help reduce the time until the UE may transmit the interference report in situations where, depending on the time division duplex configuration, the quantity of uplink slots and/or symbols would, without the multiplexing, be insufficient to report the interference report in addition to the other uplink reports in a timely manner.

The UE may multiplex the interference report before or after performing a channel coding operation for one or more of the interference report or the uplink communication (e.g., before or after encoding the interference report and/or the uplink communication for transmission). Multiplexing interference reports 810 before channel coding operations may be simpler to implement (e.g., each interference report may have a different error rate and/or a different reliability), and multiplexing interference reports 810 after channel coding operations may utilize unused bits in each report more efficiently.

As indicated above, FIG. 8 is provided as an example. Other examples may differ from what is described with respect to FIG. 8.

In some examples, a network node (e.g., network node 110) may output, and a UE (e.g., UE 120) may receive, a configuration that includes a priority indication of a priority associated with an interference report. For example, the configuration may be the configuration shown by reference number 410 in FIG. 4, and the interference report may include the interference report shown by reference number 420 in FIG. 4. The UE may transmit the interference report in accordance with the configuration (e.g., in accordance with the priority).

By assigning a priority to the interference report, the network node may help the UE resolve conflicts when the interference report collides with other reports (e.g., HARQ-ACK reports). In some examples, the priority of the interference report may help the UE decide whether to drop the interference report or to multiplex the interference report with other uplink communications (e.g., reports), as discussed above in reference to FIG. 8.

In some aspects, the priority associated with the interference report may be based on a time at which another interference report (e.g., a previous interference report) was transmitted. For example, the less recently the previous interference report was transmitted, the higher the priority of the interference report may be. For example, an interference report may have a higher priority when the previous interference report was transmitted 30 milliseconds (ms) before a reference time (e.g., a time at which the network node generates the configuration) than when the previous interference report was transmitted 100 ms before the reference time (if all else is equal). Basing the priority of an interference report on the time at which another interference report was transmitted may increase the probability that the network node receives an update regarding the estimated or predicted interference experienced by the UE (e.g., the interference report) as the time since the most recent update increases.

In some aspects, the priority associated with the interference report may be based on one or more mixing probabilities of the Gaussian mixture distribution. For example, the network node may assign different priorities to respective Gaussian components of the Gaussian mixture distribution based on the mixing probabilities of the respective Gaussian components. For example, a Gaussian mixture distribution may have three Gaussian components: a first Gaussian component with parameters $\pi_1=0.8$, $\mu_1=-64$, and $\sigma_1=0.47$; a second Gaussian component with parameters $\pi_2=0.19$, $\mu_2=-64$, and $\sigma_2=0.47$; and a third Gaussian component with parameters $\pi_3=0.01$, $\mu_3=-64$, and $\sigma_3=0.47$. In this example, because $\pi_1>\pi_2>\pi_3$, the first Gaussian component may have the highest priority, the third Gaussian component may have the lowest priority, and the second Gaussian component may have a middle (e.g., medium) priority.

Basing the priority on the mixing probabilities may help the UE prioritize Gaussian components that are more significant to the overall Gaussian mixture distribution (e.g., the Gaussian components having the greatest weights associated with the Gaussian mixture distribution). For example, if there are insufficient resources to report all of the Gaussian components, the UE may use the available resources to transmit the higher-priority Gaussian components (e.g., in order of priority).

In some examples, a network node (e.g., network node 110) may output, and a UE (e.g., UE 120) may receive, a configuration that configures the UE to transmit an interference report within a time period (e.g., the configuration associates the interference report with an aging or expiry period). For example, the configuration may be the configuration shown by reference number 410 in FIG. 4, and the interference report may include the interference report shown by reference number 420 in FIG. 4. In accordance with the configuration, the UE may transmit the interference report within the time period.

Configuring the UE to transmit the interference report within a time period may help ensure that the network node obtains up-to-date interference distribution data, which can change over time. For example, if the time period elapses and the UE has not transmitted the interference report (e.g., due to a lack of resources), then the UE may generate updated parameters of an updated Gaussian mixture distribution (e.g., based on updated estimated or predicted interference data). The UE may drop the interference report that was not transmitted within the time period and/or transmit an updated interference report that includes the updated parameters.

In some aspects, the UE may receive, from another UE, a request for interference information reported based at least in part on Gaussian mixture distribution fitting. For example, the other UE may request the UE to transmit the interference report (e.g., including the parameters of the Gaussian mixture distribution fitted to the estimated or predicted interference distribution information). In accordance with the request, the UE may transmit the interference report to the other UE. The other UE may, in turn, transmit the interference report to the network node.

In some examples, the UE may receive the request and transmit the interference report to the other UE over a SL. In SL communication, two or more UEs may communicate directly using one or more SL channels (for example, without using a network node as an intermediary). For example, the request for the other UE to transmit the interference report may be SL control information (SCI).

Transmitting the interference report via another UE (e.g., over a SL) may enable the network node to obtain the interference report from the UE even when the UE is outside a range of the network node. For example, the UE may be too far from the network node to send the interference report directly to the network node, but the other UE may be positioned within range of the network node to communicate with the network node directly. Thus, based on the interference report obtained via the other UE, the network node may perform mobility procedures, beam management, radio resource management, radio link failure detection, beam link failure detection, scheduling decision-making, reference signal design (e.g., for demodulation), or the like.

Figure 9:
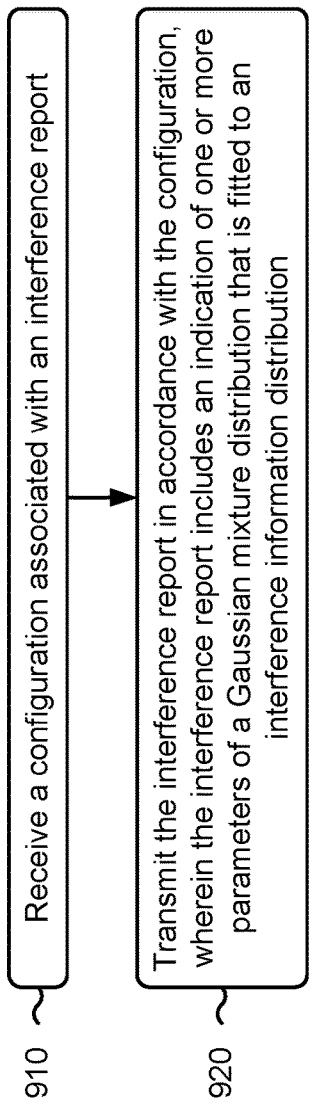
FIG. 9 is a diagram illustrating an example process performed, for example, by a UE, in accordance with the present disclosure.

FIG. 9 is a diagram illustrating an example process 900 performed, for example, by a UE, in accordance with the present disclosure. Example process 900 is an example where the UE (e.g., UE 120) performs operations associated with an interference report that is based at least in part on a Gaussian mixture distribution.

As shown in FIG. 9, in some aspects, process 900 may include receiving a configuration associated with an interference report (block 910). For example, the UE (e.g., using reception component 1102 and/or communication manager 1106, depicted in FIG. 11) may receive a configuration associated with an interference report, as described above.

As further shown in FIG. 9, in some aspects, process 900 may include transmitting the interference report in accordance with the configuration, wherein the interference report includes an indication of one or more parameters of a Gaussian mixture distribution that is fitted to an interference information distribution (block 920). For example, the UE (e.g., using transmission component 1104 and/or communication manager 1106, depicted in FIG. 11) may transmit the interference report in accordance with the configuration, wherein the interference report includes an indication of one or more parameters of a Gaussian mixture distribution that is fitted to an interference information distribution, as described above.

Process 900 may include additional aspects, such as any single aspect or any combination of aspects described below and/or in connection with one or more other processes described elsewhere herein.

In a first aspect, the interference information distribution includes estimated interference information or predicted interference information.

In a second aspect, the interference information distribution includes one or more of interference power information or signal-to-interference-plus-noise information.

In a third aspect, the configuration configures the UE to include, in the interference report, the indication of the one or more parameters based at least in part on a differential encoding scheme, and the interference report includes the indication of the one or more parameters based at least in part on the differential encoding scheme.

In a fourth aspect, the configuration configures the UE to include, in the interference report, the indication of the one or more parameters relative to one or more reference parameters of a reference Gaussian component, and the interference report includes the indication of the one or more parameters relative to the one or more reference parameters.

In a fifth aspect, the one or more parameters are one or more first parameters of a first Gaussian component of the Gaussian mixture distribution, the configuration configures the UE to include, in the interference report, the indication of the one or more first parameters relative to one or more second parameters of a second Gaussian component of the Gaussian mixture distribution, and the interference report includes the indication of the one or more first parameters relative to the one or more second parameters.

In a sixth aspect, the one or more second parameters include a mixing probability of the second Gaussian component, and the mixing probability is a highest mixing probability of the Gaussian mixture distribution.

In a seventh aspect, the one or more first parameters include a first mixing probability of the first Gaussian component, and the one or more second parameters include a second mixing probability of the second Gaussian component, and the second mixing probability is a closest mixing probability of the Gaussian mixture distribution to the first mixing probability.

In an eighth aspect, the configuration configures the UE to exclude, from the interference report, any parameters of the Gaussian mixture distribution that are associated with one or more mixing probabilities below a threshold, and the interference report excludes any parameters of the Gaussian mixture distribution that are associated with the one or more mixing probabilities below the threshold.

In a ninth aspect, the configuration configures the UE to include, in the interference report, the indication of the one or more parameters based at least in part on a quantization table, and the interference report includes the indication of the one or more parameters based at least in part on the quantization table.

In a tenth aspect, the one or more parameters include one or more mixing probabilities, and the quantization table defines quantities of quantization bits based at least in part on respective value ranges for the one or more mixing probabilities.

In an eleventh aspect, the one or more parameters include one or more mixing probabilities, and the quantization table defines quantities of quantization bits based at least in part on a numerical order of values for the one or more mixing probabilities.

In a twelfth aspect, the configuration configures periodic or semi-persistent resources for the UE to transmit respective interference reports, and transmitting the interference report includes transmitting the interference report via a first periodic or semi-persistent resource of the periodic or semi-persistent resources.

In a thirteenth aspect, the interference report is a first interference report, the one or more parameters of the Gaussian mixture distribution are one or more first parameters of a first Gaussian mixture distribution, and the indication of the one or more first parameters is a first parameter indication of the one or more first parameters, process 900 further including transmitting, via a second periodic or semi-persistent resource of the periodic or semi-persistent resources, a second interference report that includes a second parameter indication of one or more second parameters of a second Gaussian mixture distribution relative to the one or more first parameters.

In a fourteenth aspect, the configuration configures the UE to multiplex the interference report with an uplink communication, and transmitting the interference report includes multiplexing the interference report with the uplink communication.

In a fifteenth aspect, multiplexing the interference report with the uplink communication includes multiplexing the interference report with the uplink communication before performing a channel coding operation for one or more of the interference report or the uplink communication.

In a sixteenth aspect, multiplexing the interference report with the uplink communication includes multiplexing the interference report with the uplink communication after performing a channel coding operation for one or more of the interference report or the uplink communication.

In a seventeenth aspect, the configuration includes a priority indication of a priority associated with the interference report, and transmitting the interference report includes transmitting the interference report in accordance with the priority.

In an eighteenth aspect, the priority is based at least in part on a time at which another interference report was transmitted.

In a nineteenth aspect, the one or more parameters include one or more mixing probabilities of the Gaussian mixture distribution, and the priority is based at least in part on the one or more mixing probabilities.

In a twentieth aspect, the configuration configures the UE to transmit the interference report within a time period, and transmitting the interference report includes transmitting the interference report within the time period.

In a twenty-first aspect, the UE is a first UE, process 900 further including receiving, from a second UE, a request for interference information reported based at least in part on Gaussian mixture distribution fitting, wherein transmitting the interference report includes transmitting the interference report to the second UE in accordance with the request.

In a twenty-second aspect, the one or more parameters include one or more of a mean of a Gaussian component of the Gaussian mixture distribution, a variance or covariance matrix of the Gaussian component of the Gaussian mixture distribution, or a mixing probability of the Gaussian component of the Gaussian mixture distribution.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
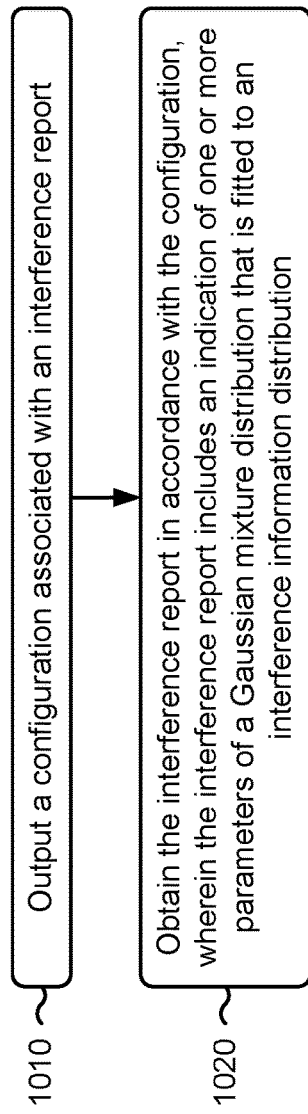
FIG. 10 is a diagram illustrating an example process performed, for example, by a network node, in accordance with the present disclosure.
Figure 10:

FIG. 10 is a diagram illustrating an example process 1000 performed, for example, by a network node, in accordance with the present disclosure. Example process 1000 is an example where the network node (e.g., network node 110) performs operations associated with an interference report that is based at least in part on a Gaussian mixture distribution.

As shown in FIG. 10, in some aspects, process 1000 may include outputting a configuration associated with an interference report (block 1010). For example, the network node (e.g., using transmission component 1204 and/or communication manager 1206, depicted in FIG. 12) may output a configuration associated with an interference report, as described above.

As further shown in FIG. 10, in some aspects, process 1000 may include obtaining the interference report in accordance with the configuration, wherein the interference report includes an indication of one or more parameters of a Gaussian mixture distribution that is fitted to an interference information distribution (block 1020). For example, the network node (e.g., using reception component 1202 and/or communication manager 1206, depicted in FIG. 12) may obtain the interference report in accordance with the configuration, wherein the interference report includes an indication of one or more parameters of a Gaussian mixture distribution that is fitted to an interference information distribution, as described above.

Process 1000 may include additional aspects, such as any single aspect or any combination of aspects described below and/or in connection with one or more other processes described elsewhere herein.

In a first aspect, the interference information distribution includes estimated interference information or predicted interference information.

In a second aspect, the interference information distribution includes one or more of interference power information or signal-to-interference-plus-noise information.

In a third aspect, the configuration configures a UE to include, in the interference report, the indication of the one or more parameters based at least in part on a differential encoding scheme, and the interference report includes the indication of the one or more parameters based at least in part on the differential encoding scheme.

In a fourth aspect, the configuration configures the UE to include, in the interference report, the indication of the one or more parameters relative to one or more reference parameters of a reference Gaussian component, and the interference report includes the indication of the one or more parameters relative to the one or more reference parameters.

In a fifth aspect, the one or more parameters are one or more first parameters of a first Gaussian component of the Gaussian mixture distribution, the configuration configures the UE to include, in the interference report, the indication of the one or more first parameters relative to one or more second parameters of a second Gaussian component of the Gaussian mixture distribution, and the interference report includes the indication of the one or more first parameters relative to the one or more second parameters.

In a sixth aspect, the one or more second parameters include a mixing probability of the second Gaussian component, and the mixing probability is a highest mixing probability of the Gaussian mixture distribution.

In a seventh aspect, the one or more first parameters include a first mixing probability of the first Gaussian component, and the one or more second parameters include a second mixing probability of the second Gaussian component, and the second mixing probability is a closest mixing probability of the Gaussian mixture distribution to the first mixing probability.

In an eighth aspect, the configuration configures a UE to exclude, from the interference report, any parameters of the Gaussian mixture distribution that are associated with one or more mixing probabilities below a threshold, and the interference report excludes any parameters of the Gaussian mixture distribution that are associated with the one or more mixing probabilities below the threshold.

In a ninth aspect, the configuration configures a UE to include, in the interference report, the indication of the one or more parameters based at least in part on a quantization table, and the interference report includes the indication of the one or more parameters based at least in part on the quantization table.

In a tenth aspect, the one or more parameters include one or more mixing probabilities, and the quantization table defines quantities of quantization bits based at least in part on respective value ranges for the one or more mixing probabilities.

In an eleventh aspect, the one or more parameters include one or more mixing probabilities, and the quantization table defines quantities of quantization bits based at least in part on a numerical order of values for the one or more mixing probabilities.

In a twelfth aspect, the configuration configures periodic or semi-persistent resources for a UE to transmit respective interference reports, and obtaining the interference report includes obtaining the interference report via a first periodic or semi-persistent resource of the periodic or semi-persistent resources.

In a thirteenth aspect, the interference report is a first interference report, the one or more parameters of the Gaussian mixture distribution are one or more first parameters of a first Gaussian mixture distribution, and the indication of the one or more first parameters is a first parameter indication of the one or more first parameters, process 1000 further including obtaining, via a second periodic or semi-persistent resource of the periodic or semi-persistent resources, a second interference report that includes a second parameter indication of one or more second parameters of a second Gaussian mixture distribution relative to the one or more first parameters.

In a fourteenth aspect, the configuration configures a UE to multiplex the interference report with an uplink communication, and the interference report is multiplexed with the uplink communication.

In a fifteenth aspect, the configuration includes a priority indication of a priority associated with the interference report, and obtaining the interference report includes obtaining the interference report in accordance with the priority.

In a sixteenth aspect, the priority is based at least in part on a time at which another interference report was transmitted.

In a seventeenth aspect, the one or more parameters include one or more mixing probabilities of the Gaussian mixture distribution, and the priority is based at least in part on the one or more mixing probabilities.

In an eighteenth aspect, the configuration configures the UE to transmit the interference report within a time period, and obtaining the interference report includes obtaining the interference report within the time period.

In a nineteenth aspect, obtaining the interference report includes obtaining the interference report from a first UE via a second UE.

In a twentieth aspect, the one or more parameters include one or more of a mean of a Gaussian component of the Gaussian mixture distribution, a variance or covariance matrix of the Gaussian component of the Gaussian mixture distribution, or a mixing probability of the Gaussian component of the Gaussian mixture distribution.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
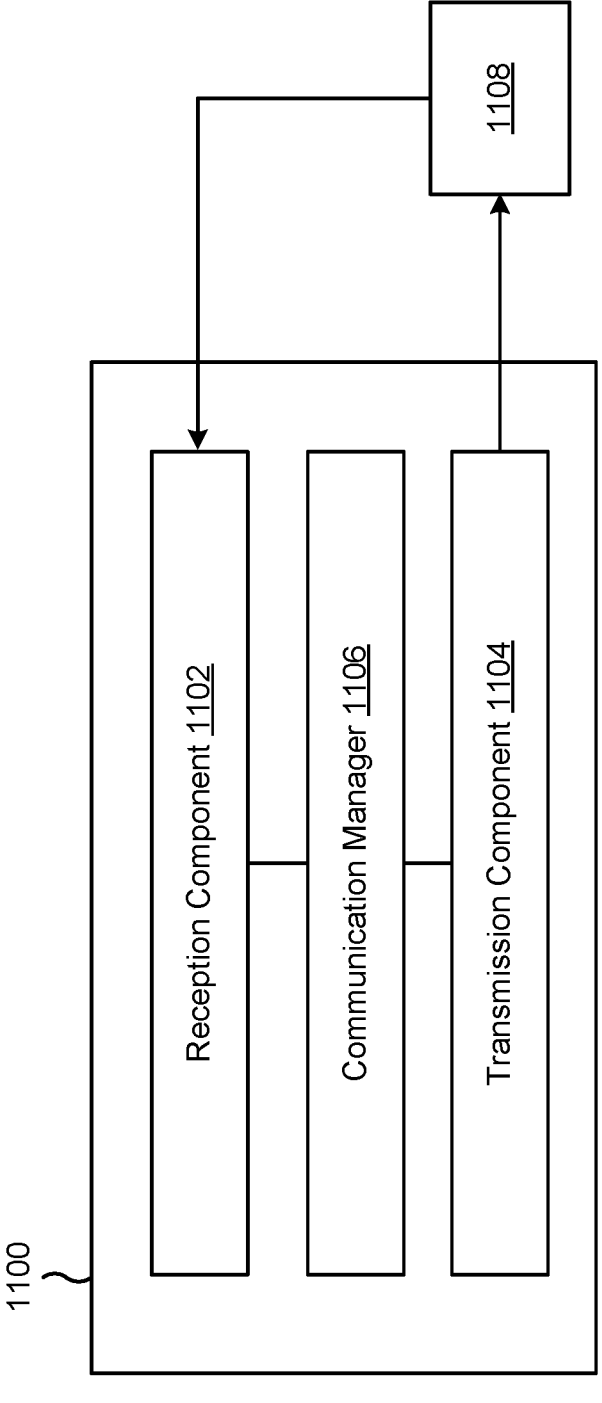
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a UE, or a UE may include the apparatus 1100. In some aspects, the apparatus 1100 includes a reception component 1102, a transmission component 1104, and/or a communication manager 1106, which may be in communication with one another (for example, via one or more buses and/or one or more other components). In some aspects, the communication manager 1106 is the communication manager 140 described in connection with FIG. 1. As shown, the apparatus 1100 may communicate with another apparatus 1108, such as a UE or a network node (such as a CU, a DU, an RU, or a BS), using the reception component 1102 and the transmission component 1104.

In some aspects, the apparatus 1100 may be configured to perform one or more operations described herein in connection with FIGS. 4-8. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1108. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1108. In some aspects, one or more other components of the apparatus 1100 may generate communications and may provide the generated communications to the transmission component 1104 for transmission to the apparatus 1108. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The communication manager 1106 may support operations of the reception component 1102 and/or the transmission component 1104. For example, the communication manager 1106 may receive information associated with configuring reception of communications by the reception component 1102 and/or transmission of communications by the transmission component 1104. Additionally, or alternatively, the communication manager 1106 may generate and/or provide control information to the reception component 1102 and/or the transmission component 1104 to control reception and/or transmission of communications.

The reception component 1102 may receive a configuration associated with an interference report. The transmission component 1104 may transmit the interference report in accordance with the configuration, wherein the interference report includes an indication of one or more parameters of a Gaussian mixture distribution that is fitted to an interference information distribution.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
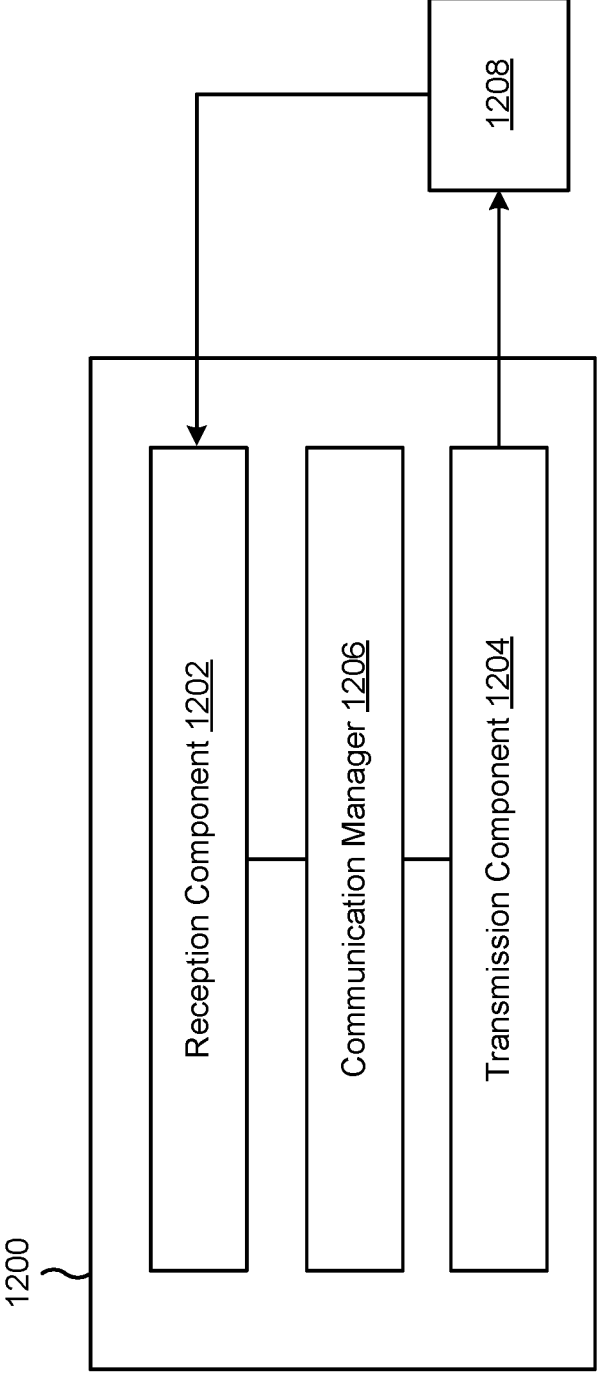
FIG. 12 is a diagram of an example apparatus for wireless communication, in accordance with the present disclosure.

FIG. 12 is a diagram of an example apparatus 1200 for wireless communication, in accordance with the present disclosure. The apparatus 1200 may be a network node, or a network node may include the apparatus 1200. In some aspects, the apparatus 1200 includes a reception component 1202, a transmission component 1204, and/or a communication manager 1206, which may be in communication with one another (for example, via one or more buses and/or one or more other components). In some aspects, the communication manager 1206 is the communication manager 150 described in connection with FIG. 1. As shown, the apparatus 1200 may communicate with another apparatus 1208, such as a UE or a network node (such as a CU, a DU, an RU, or a BS), using the reception component 1202 and the transmission component 1204.

In some aspects, the apparatus 1200 may be configured to perform one or more operations described herein in connection with FIGS. 4-8. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the network node described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1208. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the network node described in connection with FIG. 2. In some aspects, the reception component 1202 and/or the transmission component 1204 may include or may be included in a network interface. The network interface may be configured to obtain and/or output signals for the apparatus 1200 via one or more communications links, such as a backhaul link, a midhaul link, and/or a fronthaul link.

The transmission component 1204 may transmit communications, such as reference signals, control information, data communications, or a combination thereof, to the apparatus 1208. In some aspects, one or more other components of the apparatus 1200 may generate communications and may provide the generated communications to the transmission component 1204 for transmission to the apparatus 1208. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1208. In some aspects, the transmission component 1204 may include one or more antennas, a modem, a modulator, a transmit MIMO processor, a transmit processor, a controller/processor, a memory, or a combination thereof, of the network node described in connection with FIG. 2. In some aspects, the transmission component 1204 may be co-located with the reception component 1202 in a transceiver.

The communication manager 1206 may support operations of the reception component 1202 and/or the transmission component 1204. For example, the communication manager 1206 may receive information associated with configuring reception of communications by the reception component 1202 and/or transmission of communications by the transmission component 1204. Additionally, or alternatively, the communication manager 1206 may generate and/or provide control information to the reception component 1202 and/or the transmission component 1204 to control reception and/or transmission of communications.

The transmission component 1204 may output a configuration associated with an interference report. The reception component 1202 may obtain the interference report in accordance with the configuration, wherein the interference report includes an indication of one or more parameters of a Gaussian mixture distribution that is fitted to an interference information distribution.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a UE, comprising: receiving a configuration associated with an interference report; and transmitting the interference report in accordance with the configuration, wherein the interference report includes an indication of one or more parameters of a Gaussian mixture distribution that is fitted to an interference information distribution.

Aspect 2: The method of Aspect 1, wherein the interference information distribution includes estimated interference information or predicted interference information.

Aspect 3: The method of any of Aspects 1-2, wherein the interference information distribution includes one or more of interference power information or signal-to-interference-plus-noise information.

Aspect 4: The method of any of Aspects 1-3, wherein the configuration configures the UE to include, in the interference report, the indication of the one or more parameters based at least in part on a differential encoding scheme, and wherein the interference report includes the indication of the one or more parameters based at least in part on the differential encoding scheme.

Aspect 5: The method of Aspect 4, wherein the configuration configures the UE to include, in the interference report, the indication of the one or more parameters relative to one or more reference parameters of a reference Gaussian component, and wherein the interference report includes the indication of the one or more parameters relative to the one or more reference parameters.

Aspect 6: The method of Aspect 4, wherein the one or more parameters are one or more first parameters of a first Gaussian component of the Gaussian mixture distribution, wherein the configuration configures the UE to include, in the interference report, the indication of the one or more first parameters relative to one or more second parameters of a second Gaussian component of the Gaussian mixture distribution, and wherein the interference report includes the indication of the one or more first parameters relative to the one or more second parameters.

Aspect 7: The method of Aspect 6, wherein the one or more second parameters include a mixing probability of the second Gaussian component, and the mixing probability is a highest mixing probability of the Gaussian mixture distribution.

Aspect 8: The method of Aspect 6, wherein the one or more first parameters include a first mixing probability of the first Gaussian component, and the one or more second parameters include a second mixing probability of the second Gaussian component, and wherein the second mixing probability is a closest mixing probability of the Gaussian mixture distribution to the first mixing probability.

Aspect 9: The method of any of Aspects 1-8, wherein the configuration configures the UE to exclude, from the interference report, any parameters of the Gaussian mixture distribution that are associated with one or more mixing probabilities below a threshold, and wherein the interference report excludes any parameters of the Gaussian mixture distribution that are associated with the one or more mixing probabilities below the threshold.

Aspect 10: The method of any of Aspects 1-9, wherein the configuration configures the UE to include, in the interference report, the indication of the one or more parameters based at least in part on a quantization table, and wherein the interference report includes the indication of the one or more parameters based at least in part on the quantization table.

Aspect 11: The method of Aspect 10, wherein the one or more parameters include one or more mixing probabilities, and wherein the quantization table defines quantities of quantization bits based at least in part on respective value ranges for the one or more mixing probabilities.

Aspect 12: The method of Aspect 10, wherein the one or more parameters include one or more mixing probabilities, and wherein the quantization table defines quantities of quantization bits based at least in part on a numerical order of values for the one or more mixing probabilities.

Aspect 13: The method of any of Aspects 1-12, wherein the configuration configures periodic or semi-persistent resources for the UE to transmit respective interference reports, and wherein transmitting the interference report includes:

transmitting the interference report via a first periodic or semi-persistent resource of the periodic or semi-persistent resources.

Aspect 14: The method of Aspect 13, wherein the interference report is a first interference report, wherein the one or more parameters of the Gaussian mixture distribution are one or more first parameters of a first Gaussian mixture distribution, and wherein the indication of the one or more first parameters is a first parameter indication of the one or more first parameters, the method further comprising: transmitting, via a second periodic or semi-persistent resource of the periodic or semi-persistent resources, a second interference report that includes a second parameter indication of one or more second parameters of a second Gaussian mixture distribution relative to the one or more first parameters.

Aspect 15: The method of any of Aspects 1-14, wherein the configuration configures the UE to multiplex the interference report with an uplink communication, and wherein transmitting the interference report includes: multiplexing the interference report with the uplink communication.

Aspect 16: The method of Aspect 15, wherein multiplexing the interference report with the uplink communication includes: multiplexing the interference report with the uplink communication before performing a channel coding operation for one or more of the interference report or the uplink communication.

Aspect 17: The method of Aspect 15, wherein multiplexing the interference report with the uplink communication includes: multiplexing the interference report with the uplink communication after performing a channel coding operation for one or more of the interference report or the uplink communication.

Aspect 18: The method of any of Aspects 1-17, wherein the configuration includes a priority indication of a priority associated with the interference report, and wherein transmitting the interference report includes: transmitting the interference report in accordance with the priority.

Aspect 19: The method of Aspect 18, wherein the priority is based at least in part on a time at which another interference report was transmitted.

Aspect 20: The method of Aspect 18, wherein the one or more parameters include one or more mixing probabilities of the Gaussian mixture distribution, and wherein the priority is based at least in part on the one or more mixing probabilities.

Aspect 21: The method of any of Aspects 1-20, wherein the configuration configures the UE to transmit the interference report within a time period, and wherein transmitting the interference report includes: transmitting the interference report within the time period.

Aspect 22: The method of any of Aspects 1-21, wherein the UE is a first UE, the method further comprising: receiving, from a second UE, a request for interference information reported based at least in part on Gaussian mixture distribution fitting, wherein transmitting the interference report includes: transmitting the interference report to the second UE in accordance with the request.

Aspect 23: The method of any of Aspects 1-22, wherein the one or more parameters include one or more of: a mean of a Gaussian component of the Gaussian mixture distribution, a variance or covariance matrix of the Gaussian component of the Gaussian mixture distribution, or a mixing probability of the Gaussian component of the Gaussian mixture distribution.

Aspect 24: A method of wireless communication performed by a network node, comprising: outputting a configuration associated with an interference report; and obtaining the interference report in accordance with the configuration, wherein the interference report includes an indication of one or more parameters of a Gaussian mixture distribution that is fitted to an interference information distribution.

Aspect 25: The method of Aspect 24, wherein the interference information distribution includes estimated interference information or predicted interference information.

Aspect 26: The method of any of Aspects 24-25, wherein the interference information distribution includes one or more of interference power information or signal-to-interference-plus-noise information.

Aspect 27: The method of any of Aspects 24-26, wherein the configuration configures a UE to include, in the interference report, the indication of the one or more parameters based at least in part on a differential encoding scheme, and wherein the interference report includes the indication of the one or more parameters based at least in part on the differential encoding scheme.

Aspect 28: The method of Aspect 27, wherein the configuration configures the UE to include, in the interference report, the indication of the one or more parameters relative to one or more reference parameters of a reference Gaussian component, and wherein the interference report includes the indication of the one or more parameters relative to the one or more reference parameters.

Aspect 29: The method of Aspect 27, wherein the one or more parameters are one or more first parameters of a first Gaussian component of the Gaussian mixture distribution, wherein the configuration configures the UE to include, in the interference report, the indication of the one or more first parameters relative to one or more second parameters of a second Gaussian component of the Gaussian mixture distribution, and wherein the interference report includes the indication of the one or more first parameters relative to the one or more second parameters.

Aspect 30: The method of Aspect 29, wherein the one or more second parameters include a mixing probability of the second Gaussian component, and the mixing probability is a highest mixing probability of the Gaussian mixture distribution.

Aspect 31: The method of Aspect 29, wherein the one or more first parameters include a first mixing probability of the first Gaussian component, and the one or more second parameters include a second mixing probability of the second Gaussian component, and wherein the second mixing probability is a closest mixing probability of the Gaussian mixture distribution to the first mixing probability.

Aspect 32: The method of any of Aspects 24-31, wherein the configuration configures a UE to exclude, from the interference report, any parameters of the Gaussian mixture distribution that are associated with one or more mixing probabilities below a threshold, and wherein the interference report excludes any parameters of the Gaussian mixture distribution that are associated with the one or more mixing probabilities below the threshold.

Aspect 33: The method of any of Aspects 24-32, wherein the configuration configures a UE to include, in the interference report, the indication of the one or more parameters based at least in part on a quantization table, and wherein the interference report includes the indication of the one or more parameters based at least in part on the quantization table.

Aspect 34: The method of Aspect 33, wherein the one or more parameters include one or more mixing probabilities, and wherein the quantization table defines quantities of quantization bits based at least in part on respective value ranges for the one or more mixing probabilities.

Aspect 35: The method of Aspect 33, wherein the one or more parameters include one or more mixing probabilities, and wherein the quantization table defines quantities of quantization bits based at least in part on a numerical order of values for the one or more mixing probabilities.

Aspect 36: The method of any of Aspects 24-35, wherein the configuration configures periodic or semi-persistent resources for a UE to transmit respective interference reports, and wherein obtaining the interference report includes: obtaining the interference report via a first periodic or semi-persistent resource of the periodic or semi-persistent resources.

Aspect 37: The method of Aspect 36, wherein the interference report is a first interference report, wherein the one or more parameters of the Gaussian mixture distribution are one or more first parameters of a first Gaussian mixture distribution, and wherein the indication of the one or more first parameters is a first parameter indication of the one or more first parameters, the method further comprising: obtaining, via a second periodic or semi-persistent resource of the periodic or semi-persistent resources, a second interference report that includes a second parameter indication of one or more second parameters of a second Gaussian mixture distribution relative to the one or more first parameters.

Aspect 38: The method of any of Aspects 24-37, wherein the configuration configures a UE to multiplex the interference report with an uplink communication, and wherein the interference report is multiplexed with the uplink communication.

Aspect 39: The method of any of Aspects 24-38, wherein the configuration includes a priority indication of a priority associated with the interference report, and wherein obtaining the interference report includes: obtaining the interference report in accordance with the priority.

Aspect 40: The method of Aspect 39, wherein the priority is based at least in part on a time at which another interference report was transmitted.

Aspect 41: The method of Aspect 39, wherein the one or more parameters include one or more mixing probabilities of the Gaussian mixture distribution, and wherein the priority is based at least in part on the one or more mixing probabilities.

Aspect 42: The method of any of Aspects 24-41, wherein the configuration configures the UE to transmit the interference report within a time period, and wherein obtaining the interference report includes: obtaining the interference report within the time period.

Aspect 43: The method of any of Aspects 24-42, wherein obtaining the interference report includes: obtaining the interference report from a first UE via a second UE.

Aspect 44: The method of any of Aspects 24-43, wherein the one or more parameters include one or more of: a mean of a Gaussian component of the Gaussian mixture distribution, a variance or covariance matrix of the Gaussian component of the Gaussian mixture distribution, or a mixing probability of the Gaussian component of the Gaussian mixture distribution.

Aspect 45: An apparatus for wireless communication at a device, comprising a processor; memory coupled with the processor; and instructions stored in the memory and executable by the processor to cause the apparatus to perform the method of one or more of Aspects 1-44.

Aspect 46: A device for wireless communication, comprising a memory and one or more processors coupled to the memory, the one or more processors configured to perform the method of one or more of Aspects 1-44.

Aspect 47: An apparatus for wireless communication, comprising at least one means for performing the method of one or more of Aspects 1-44.

Aspect 48: A non-transitory computer-readable medium storing code for wireless communication, the code comprising instructions executable by a processor to perform the method of one or more of Aspects 1-44.

Aspect 49: A non-transitory computer-readable medium storing a set of instructions for wireless communication, the set of instructions comprising one or more instructions that, when executed by one or more processors of a device, cause the device to perform the method of one or more of Aspects 1-44.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:

one or more memories; and one or more processors, coupled to the one or more memories, which are configured, individually or in any combination to:

receive a configuration associated with an interference report that includes an indication of one or more parameters of a Gaussian mixture distribution fitted to interference information, wherein the one or more parameters include one or more mixing probabilities of the Gaussian mixture distribution; and transmit the interference report, in accordance with the configuration, to include the indication of the one or more parameters of the Gaussian mixture distribution that is fitted, by the UE, to the interference information distribution.

2. The UE of claim 1, wherein the interference information includes estimated interference information or predicted interference information.

3. The UE of claim 1, wherein the interference information includes one or more of interference power information or signal-to-interference-plus-noise information.

4. The UE of claim 1, wherein the configuration configures the UE to include, in the interference report, the indication of the one or more parameters based at least in part on a differential encoding scheme, and wherein the interference report includes the indication of the one or more parameters based at least in part on the differential encoding scheme.

5. The UE of claim 4, wherein the configuration configures the UE to include, in the interference report, the indication of the one or more parameters relative to one or more reference parameters of a reference Gaussian component, and wherein the interference report includes the indication of the one or more parameters relative to the one or more reference parameters.

6. The UE of claim 4, wherein the one or more parameters are one or more first parameters of a first Gaussian component of the Gaussian mixture distribution, wherein the configuration configures the UE to include, in the interference report, the indication of the one or more first parameters relative to one or more second parameters of a second Gaussian component of the Gaussian mixture distribution, and wherein the interference report includes the indication of the one or more first parameters relative to the one or more second parameters.

7. The UE of claim 6, wherein the one or more second parameters include a mixing probability of the second Gaussian component, and the mixing probability is a highest mixing probability of the Gaussian mixture distribution.

8. The UE of claim 6, wherein the one or more first parameters include a first mixing probability of the first Gaussian component, and the one or more second parameters include a second mixing probability of the second Gaussian component, and wherein the second mixing probability is a closest mixing probability of the Gaussian mixture distribution to the first mixing probability.

9. The UE of claim 1, wherein the configuration configures the UE to exclude, from the interference report, any parameters of the Gaussian mixture distribution that are associated with one or more mixing probabilities below a threshold, and wherein the interference report excludes any parameters of the Gaussian mixture distribution that are associated with the one or more mixing probabilities below the threshold.

10. The UE of claim 1, wherein the configuration configures the UE to include, in the interference report, the indication of the one or more parameters based at least in part on a quantization table, and wherein the interference report includes the indication of the one or more parameters based at least in part on the quantization table.

11. The UE of claim 10, wherein the quantization table defines quantities of quantization bits based at least in part on respective value ranges for the one or more mixing probabilities.

12. The UE of claim 10, wherein the quantization table defines quantities of quantization bits based at least in part on a numerical order of values for the one or more mixing probabilities.

13. The UE of claim 1, wherein the configuration configures periodic or semi-persistent resources for the UE to transmit respective interference reports, and wherein the one or more processors, to transmit the interference report, are configured to:

transmit the interference report via a first periodic or semi-persistent resource of the periodic or semi-persistent resources.

14. The UE of claim 13, wherein the interference report is a first interference report, wherein the one or more parameters of the Gaussian mixture distribution are one or more first parameters of a first Gaussian mixture distribution, and wherein the indication of the one or more first parameters is a first parameter indication of the one or more first parameters, wherein the one or more processors are further configured to:

transmit, via a second periodic or semi-persistent resource of the periodic or semi-persistent resources, a second interference report that includes a second parameter indication of one or more second parameters of a second Gaussian mixture distribution relative to the one or more first parameters.

15. The UE of claim 1, wherein the configuration configures the UE to multiplex the interference report with an uplink communication, and wherein the one or more processors, to transmit the interference report, are configured to:

multiplex the interference report with the uplink communication.

16. The UE of claim 15, wherein the one or more processors, to multiplex the interference report with the uplink communication, are configured to:

multiplex the interference report with the uplink communication before performing a channel coding operation for one or more of the interference report or the uplink communication.

17. The UE of claim 15, wherein the one or more processors, to multiplex the interference report with the uplink communication, are configured to:

multiplex the interference report with the uplink communication after performing a channel coding operation for one or more of the interference report or the uplink communication.

18. The UE of claim 1, wherein the configuration includes a priority indication of a priority associated with the interference report, and wherein the one or more processors, to transmit the interference report, are configured to:

transmit the interference report in accordance with the priority.

19. The UE of claim 18, wherein the priority is based at least in part on a time at which another interference report was transmitted.

20. The UE of claim 18, wherein the priority is based at least in part on the one or more mixing probabilities.

21. The UE of claim 1, wherein the configuration configures the UE to transmit the interference report within a time period, and wherein the one or more processors, to transmit the interference report, are configured to:

transmit the interference report within the time period.

22. The UE of claim 1, wherein the UE is a first UE, and wherein the one or more processors are further configured to:

receive, from a second UE, a request for interference information reported based at least in part on Gaussian mixture distribution fitting, wherein the one or more processors, to transmit the interference report, are configured to:

transmit the interference report to the second UE in accordance with the request.

23. The UE of claim 1, wherein the one or more parameters further include one or more of:

a mean of a Gaussian component of the Gaussian mixture distribution, or a variance or covariance matrix of the Gaussian component of the Gaussian mixture distribution.

24. A network node for wireless communication, comprising:

one or more memories; and one or more processors, coupled to the one or more memories, which are configured, individually or in any combination to:

output a configuration associated with an interference report that includes an indication of one or more parameters of a Gaussian mixture distribution fitted to interference information, wherein the one or more parameters include one or more mixing probabilities of the Gaussian mixture distribution; and obtain the interference report, in accordance with the configuration, that includes the indication of the one or more parameters of the Gaussian mixture distribution that is fitted to the interference information.

25. The network node of claim 24, wherein the configuration configures a user equipment (UE) to include, in the interference report, the indication of the one or more parameters based at least in part on a differential encoding scheme, and wherein the interference report includes the indication of the one or more parameters based at least in part on the differential encoding scheme.

26. The network node of claim 24, wherein the configuration configures a user equipment (UE) to include, in the interference report, the indication of the one or more parameters based at least in part on a quantization table, and wherein the interference report includes the indication of the one or more parameters based at least in part on the quantization table.

27. A method of wireless communication performed by a user equipment (UE), comprising:

receiving a configuration associated with an interference report that includes an indication of one or more parameters of a Gaussian mixture distribution fitted to interference information, wherein the one or more parameters include one or more mixing probabilities of the Gaussian mixture distribution; and transmitting the interference report, in accordance with the configuration, to include the indication of the one or more parameters of the Gaussian mixture distribution that is fitted, by the UE, to the interference information.

28. The method of claim 27, wherein the configuration configures the UE to include, in the interference report, the indication of the one or more parameters based at least in part on a differential encoding scheme, and wherein the interference report includes the indication of the one or more parameters based at least in part on the differential encoding scheme.

29. A method of wireless communication performed by a network node, comprising:

outputting a configuration associated with an interference report that includes an indication of one or more parameters of a Gaussian mixture distribution fitted to interference information, wherein the one or more parameters include one or more mixing probabilities of the Gaussian mixture distribution; and obtaining the interference report, in accordance with the configuration, that includes the indication of the one or more parameters of the Gaussian mixture distribution that is fitted to the interference information.

30. The method of claim 29, wherein the configuration configures a user equipment (UE) to include, in the interference report, the indication of the one or more parameters based at least in part on a differential encoding scheme, and wherein the interference report includes the indication of the one or more parameters based at least in part on the differential encoding scheme.

* * * * *